(12) United States Patent
Liu et al.

(10) Patent No.: US 12,511,311 B2
(45) Date of Patent: Dec. 30, 2025

(54) DATA PROCESSING METHOD AND SYSTEM

(71) Applicant: HANGZHOU ALICLOUD FEITIAN INFORMATION TECHNOLOGY CO., LTD., Hangzhou (CN)

(72) Inventors: Xian Liu, Sunnyvale, CA (US); Fang Zheng, Sunnyvale, CA (US); Congnan Luo, San Diego, CA (US); Yuanfei Guo, Beijing (CN); Cheng Zhu, Sunnyvale, CA (US); Xiaowei Zhu, Sunnyvale, CA (US)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/684,906

(22) PCT Filed: Oct. 26, 2022

(86) PCT No.: PCT/CN2022/127511
§ 371 (c)(1),
(2) Date: Feb. 20, 2024

(87) PCT Pub. No.: WO2023/082992
PCT Pub. Date: May 19, 2023

(65) Prior Publication Data
US 2024/0354314 A1    Oct. 24, 2024

(30) Foreign Application Priority Data
Nov. 12, 2021 (CN) .......................... 202111339770.5

(51) Int. Cl.
*G06F 16/27* (2019.01)
(52) U.S. Cl.
CPC .......... *G06F 16/27* (2019.01); *G06F 2201/84* (2013.01)

(58) Field of Classification Search
CPC ...... G06F 16/27; G06F 16/273; G06F 16/275; G06F 16/278; G06F 2201/84; G06F 9/466; G06F 9/5016; G06F 9/52; G06F 9/544
See application file for complete search history.

(56) References Cited

U.S. PATENT DOCUMENTS

| | | | | |
|---|---|---|---|---|
| 7,533,223 | B1 * | 5/2009 | Vartti ................. | G06F 13/1642 711/158 |
| 8,738,860 | B1 * | 5/2014 | Griffin ............... | G06F 12/0897 711/122 |

(Continued)

FOREIGN PATENT DOCUMENTS

| CN | 108984571 A | 12/2018 |
|---|---|---|
| CN | 114255036 A | 3/2022 |

OTHER PUBLICATIONS

International Search Report English Translation, PCT/CN2022/127511, Jan. 6, 2023, pp. 1-2.

*Primary Examiner* — Merilyn P Nguyen
(74) *Attorney, Agent, or Firm* — FisherBroyles, LLP; Susan M. Oiler

(57) ABSTRACT

The present application provides a data processing method, a system, a computing device and a computer readable storage medium, wherein the data processing method is applied to a data processing node of a distributed data processing system and includes: receiving a plurality of data processing requests sent by a client, determining a target processing amount based on the number of the plurality of data processing requests, and limiting a flow of the plurality of data processing requests in accordance with the target processing amount to obtain a target data processing request; forwarding the target data processing request to a global transaction manager, receiving a processing result from processing the target data processing request by the global (Continued)

transaction manager, and returning the processing result to the client corresponding to each data processing request.

20 Claims, 6 Drawing Sheets

(56) References Cited

U.S. PATENT DOCUMENTS

| | | | | |
|---|---|---|---|---|
| 9,251,003 | B1* | 2/2016 | Gupta | ................ G06F 11/1438 |
| 2011/0219208 | A1* | 9/2011 | Asaad | ...................... G06F 9/06 |
| | | | | 712/12 |
| 2012/0131309 | A1* | 5/2012 | Johnson | ................ G06F 9/323 |
| | | | | 712/E9.004 |
| 2013/0159449 | A1* | 6/2013 | Taylor | ...................... G06F 9/54 |
| | | | | 709/212 |
| 2021/0149731 | A1* | 5/2021 | Shorb | ................ G06F 9/5016 |
| 2023/0039113 | A1* | 2/2023 | Lyu | .................... G06F 16/9024 |

* cited by examiner

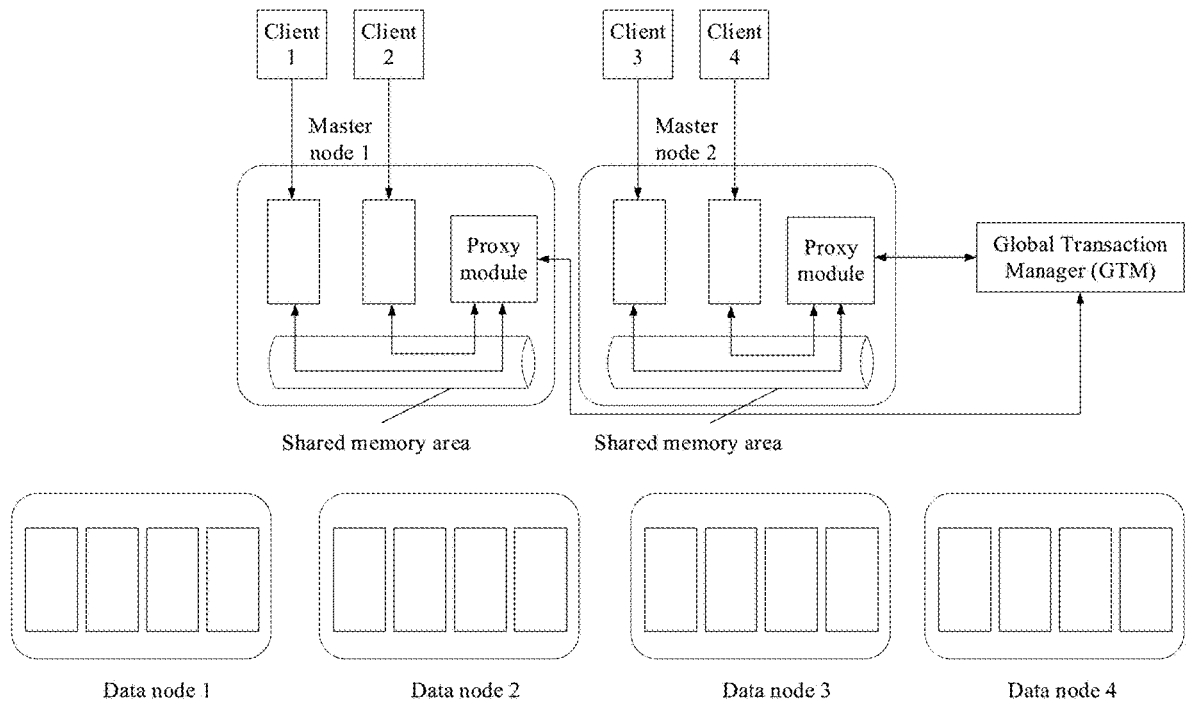

FIG. 2

--- receiving plurality of data processing requests sent by client, determining target processing amount based on number of plurality of data processing requests, and limiting flow of plurality of data processing requests in accordance with target processing amount to obtain target data processing request  /302 forwarding target data processing request to global transaction manager, receiving processing result from processing target data processing request by global transaction manager, and returning processing result to client corresponding to each data processing request  /304

FIG. 3

DATA PROCESSING METHOD AND SYSTEM

The present invention is filed under 35 U.S.C. § 371 as the U.S. national phase of International Patent Application No. PCT/CN2022/127511, filed Oct. 26, 2022, which designated the United States and which claims the benefit of Chinese patent application No. 202111339770.5, filed with the CNIPA on Nov. 12, 2021, which is incorporated herein by reference in its entirety.

TECHNICAL FIELD

The present application relates to the field of computer technology, and more specifically, to a data processing method. The present application simultaneously involves a data processing system, a computing device and a computer readable storage medium.

BACKGROUND

The database is in a multi-master MPP (Massive Parallel Processing) architecture. The system consists of two groups of computer nodes, i.e., master nodes and data nodes. The database depends on a Global Transaction Manager (GTM) assembly to support the snapshot isolation. Although the GTM assembly may be implemented through multiple processes or multiple threads to improve its concurrency, it essentially is centralized. Moreover, the increasing amount of concurrent transactions and the soaring number of connections of the GTM assembly would also become a serious bottleneck of the entire distributed database system in addition to causing a greater pressure on the operation of the GTM assembly.

SUMMARY

In view of this, the present application provides a data processing method, a data processing system, a computing device and a computer readable storage medium to solve existing technical deficiencies in the related art.

In a first aspect of the embodiments of the present application, there is provided a data processing method applied to a data processing node of a distributed data processing system, and the data processing method includes: receiving a plurality of data processing requests sent by a client, determining a target processing amount based on the number of the plurality of data processing requests, and limiting a flow of the plurality of data processing requests in accordance with the target processing amount to obtain a target data processing request; forwarding the target data processing request to a global transaction manager, receiving a processing result from processing the target data processing request by the global transaction manager, and returning the processing result to the client corresponding to each data processing request.

In a second aspect of the embodiments of the present application, there is provided a data processing system including a data processing node, wherein the data processing node includes: a request receiving module configured to receive a plurality of data processing requests sent by a client, determine a target processing amount based on the number of the plurality of data processing requests, and limit a flow of the plurality of data processing requests in accordance with the target processing amount, to obtain a target data processing request; a proxy module configured to forward the target data processing request to a global transaction manager, receive a processing result from processing the target data processing request by the global transaction manager, and return the processing result to the client corresponding to each data processing request.

In a third aspect of the embodiments of the present application, there is provided a computing device, including a memory and a processor; wherein the memory is provided for storing computer executable instructions and the processor is provided for executing the computer executable instructions; wherein the processor executes the computer executable instructions to implement steps of the above data processing method.

In a fourth aspect of the embodiments of the present application, there is provided a computer readable storage medium stored with computer executable instructions, wherein the computer executable instructions, when executed by a processor, implement steps of the above data processing method.

The above summary is provided merely to explain the description, rather than restricting it in any manners. In addition to the above described exemplary aspects, implementations and features, further aspects, implementations and features of the present application would be easily understood with reference to the drawings and the following detailed description.

BRIEF DESCRIPTION OF THE DRAWINGS

Throughout the drawings, same reference signs in different figures indicate same or similar components or elements unless indicated otherwise. The drawings may not be plotted according to a given scale. It is to be appreciated that the drawings only depict some implementations in accordance with the present application and shall not be considered as limitations over the scope of the present application.

FIG. 2 illustrates an overall architecture of a data processing system in accordance with one embodiment of the present application;

FIG. 3 illustrates a flowchart of applying the data processing method provided by one embodiment of the present application to a data processing node of the distributed data processing system;

DETAILED DESCRIPTION OF EMBODIMENTS

Figure 1:
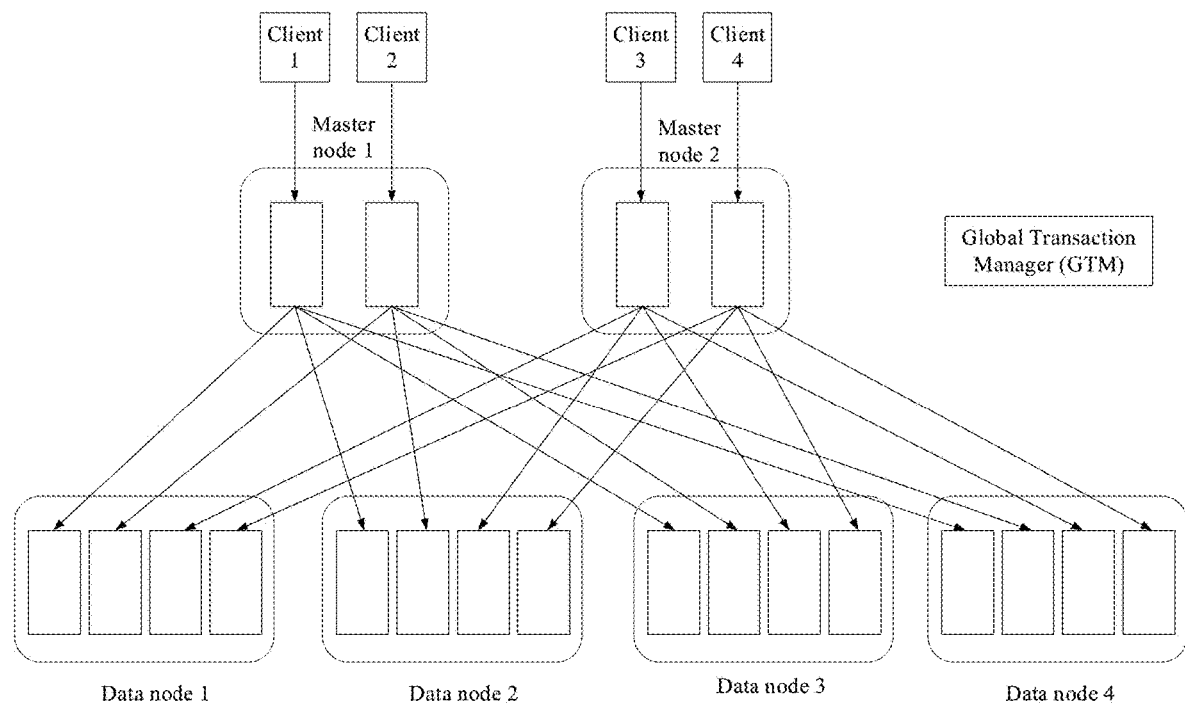
FIG. 1 illustrates a multi-master distributed database architecture of a data processing method provided in some implementations of the present application.

Many specific details are to be provided in the following description for a more comprehensive understanding of the present application. However, the present application can be implemented in ways different from those described here. Those skilled in the art may make similar modifications without deviating from the spirit of the present application.

As such, the present application is not restricted by the detailed embodiments disclosed below.

Terms used in one or more embodiment(s) of the present application are merely for describing particular embodiments, rather than restricting one or more embodiment(s) of the present application. Singular form expressions, like "one", "the" and "this", used in the one or more embodiment(s) of the present application and the attached claims may also refer to include plural cases unless clearly indicated otherwise. By disclosing "a plurality of", it generally contains more than two. However, it does not exclude the case where at least one is included. It should also be appreciated that the term "and/or" used in one or more embodiments of the present application indicates any or all possible combinations of one or more associated items listed here.

It is to be appreciated that although one or more embodiments of the present application may describe information with terms like "first" and "second", the information should not be limited by these terms. Such terms in fact are provided to distinguish the same type of information. For example, without deviating from the scope of the one or more embodiments of the present application, first may also be indicated as second and vice versa. The term "if" may be interpreted as "at the moment of . . . " or "when . . . " or "in response to determining . . . " depending on the context.

Terms involved in one or more embodiments of the present application are explained first.

Transaction is an individual logic or operating unit, sometimes consisting of a plurality of operations, in a database management system. Any logic computing is referred to as transaction as long as it is completed in a consistent mode in the database. For example, a transfer from one bank account to another. A complete deal requires deducting the amount of money to be transferred from one account and adding the same amount of money into another account.

Database transaction, by definition, must have atomicity (completed with integrity or without any influence), consistency (conforming to current constraints in the database), isolation (without affecting other transactions) and durability (written into a persistent storage). The above attributes of the database transaction are generally indicated by database practitioners with an acronym of ACID.

Distributed database is a database where data are stored at different physical locations. They may be stored in multiple computers at the same physical location (e.g., data center) or spread over interconnected computer networks.

Multi-master architecture is a prevailing way for constructing a distributed database system. In this architecture, the distributed database system consists of two groups of computer nodes, i.e., master nodes and data nodes. Each master node keeps a fresh copy of system directory and metadata (such as table and index definition). Data of the database are stored in a plurality of data nodes and constrained by user-designated partition and/or replication strategy.

Database session indicates a connection between an application (or client) and a database storing its persistent objects. The connection in general is established via TCP network protocols. Once a session is established, a client application may send SQL statements via the connection to the database to query and handle data in the database. In the aspect of the database system, the database may receive and serve all SQL statements from the session using process and thread. As long as the client application disconnects from the session, the database system would cancel assignment of any resources associated with the session (such as procedure process or thread).

Multi-Version Concurrency Control (MCC or MVCC) is a common concurrency control method adopted by the database management system for providing a concurrent access to the database. When the MVCC database needs to update a piece of data, it would create an updated version of the data item, rather than overriding the original data item. As such multiple versions are stored. The version visible to each transaction depends on implemented isolation level. The most common isolation level implemented by MVCC is snapshot isolation. With the snapshot isolation, the transaction observes the data state at the beginning.

Snapshot isolation ensures that all reads performed in one transaction will see a consistent snapshot of the database (in fact, it is the final submitted value existing at the beginning of the transaction that is read). Besides, an update of a transaction can only be successfully committed when it has no conflicts with updates of other transactions since the beginning of the snapshot.

Proxy (proxy server) is a server application or device in computer networks and serves as an intermediary of a client request to seek resources from servers providing such resources. As such, when the proxy server requests a service on behalf of the client, it may potentially hide the true source of the request for the resource server. Instead of connecting directly to a server that can satisfy the requested resource (such as a file or web page), the client directs the request to the proxy server, which evaluates the request and performs the desired network transaction. This is a way to simplify or control the complexity of requests, or provide additional benefits such as load balancing, privacy, or security.

The database employs the multi-master MPP (Massive Parallel Processing) architecture. The system consists of two groups of computer nodes, i.e., master nodes and data nodes. Each master node keeps a fresh copy of system directory and metadata (such as table and index definition). Data of the database are stored in a plurality of data nodes and constrained by user-designated partition and/or replication strategy.

The client is connected to one of the hosts (e.g., via TCP network protocol) to establish a database session, and the SQL statements may be submitted via the connection afterwards. For each SQL statement from the client, a corresponding master node would parse the SQL statement, generate an optimized query plan and assign the query plan to data nodes for execution. Each data node executes the query plan sent by the master node with locally stored data, exchanges the intermediate data when necessary and returns the query result to the master node in the end. The master node combines the final results and sends back to the client.

FIG. 1 illustrates a multi-master distributed database architecture 100 of a data processing method provided in some implementations of the present application.

The distributed database architecture 100 in FIG. 1 is a distributed database having two master database nodes, respectively being master node 1 and master node 2. Each master node corresponds to two clients, where the master node 1 corresponds to client 1 and client 2 respectively and the master node 2 corresponds to client 3 and client 4 respectively. Meanwhile, the data nodes corresponding to the two master nodes are data node 1, data node 2, data node 3 and data node 4 respectively. The multi-master distributed database architecture also has a Global Transaction Manager (GTM).

In some implementations, each matrix in FIG. 1 represents a process or thread for running transactions in one database session. The database supports database transactions with ACID attributes and conforming to SQL standards. In fact, any SQL statements submitted to the database are executed in one database transaction. Such transaction either is explicitly designated by the client through BEGIN/COMMIT/ABORT sentence or implicitly and internally created by the database system as a single SQL statement when the client does not display a specified transaction scope.

The transaction in the database usually involves a phase where a query plan is created and scheduled for SQL statements of the transaction, and a plurality of data nodes for executing the query. If a transaction contains DDL (Data Definition Language) statement that modifies the system directory and the metadata (e.g., CREATE TABLE), the transaction will span other master data in the system. As the transaction relates to a plurality of distributed computer nodes, a distributed transaction protocol is utilized to ensure that the transaction satisfies the ACID attribute. For example, the database uses a standard two-phase commit protocol. A master node acts as a coordinator for distributed transactions, and the involved data nodes (partial nodes) and other master nodes are participants. When the work in the transaction is done, the coordinator initiates a first phase known as "prepare" (or "voting") phase, which requests each participant to vote whether to commit the transaction, and each participant gives its vote (commit or abort) depending on respective local execution result as reply. If the coordinator receives commit votes from all participants, it will initiate a second phase known as "commit" phase, which requests all participants to locally commit the transaction. Once all participants confirm that the work is done, the coordinator commits the distributed transaction. If the coordinator receives any abort votes from the participants during the prepare phase, it will request all participants to locally abort the transaction and further abort the distributed transaction.

In some implementations, the database depends on a Global Transaction Manager (GTM) assembly to support the snapshot isolation, and such assembly is a popular variation of the multi-version concurrency control mechanism for managing concurrent transactions. The GTM, as a centralized service in the distributed database, is responsible for assigning a unique identifier to the transaction, tracking state of the distributed transaction (state including active, committed or aborted) and generating a distributed snapshot.

When a master node starts a distributed transaction, it will send to the GTM a request that requires registering a new transaction into the GTM and assigning a unique identifier (known as global transaction ID or GXID for short) to the transaction. The global transaction ID uniquely identifies a transaction. Each time a transaction inserts a row into the database table or modifies a row in the database table, a version of the row data is stored in the table, containing data payload and transaction ID. The transaction ID is internally implemented as hidden column, which is transparent to the database users.

After the transaction is registered in the GTM, the GTM sets the state of the transaction as active. When a corresponding master node commits or aborts the transaction later, the master node notifies the GTM to make modifications and the GTM sets the transaction state correspondingly.

When the master node assigns the query in the transaction to data nodes (Remove), it will send a distributed snapshot request to the GTM, where the content of the distributed snapshot indicates what transactions are active (according to their global transaction ID). To compute the distributed snapshot, the GTM checks the tracking record of the transaction states and returns the ID of all currently active transactions. The distributed snapshot query is sent to the data nodes with the query plan. When a data node needs to access a row in the table while executing the query, it may use the distributed snapshot to determine whether a given version of the row is visible to the current transaction. For example, if the executing transaction ID column is in the active transaction set of the distributed snapshot, the current transaction should not read this version; otherwise, data would be read from the transactions not committed, violating the isolation attribute.

Although the GTM assembly may be implemented through multiple processes or multiple threads to improve its concurrency, it essentially is centralized. The increasing amount of transactions would become a serious bottleneck of the system. There are two major barriers to scaling GTM for high concurrency.

First, assuming that each master node at most can receive N client sessions and there are M master nodes in the multi-master distributed database, the system may have at most N*M concurrent sessions at any moment. If each session creates its own TCP connection with the GTM, the GTM is required to process a maximum of N*M connections. In a large-scale deployment with high-concurrency, this may exceed the TCP connection limitation for a single machine. Since the whole benefit of having multiple master nodes is to provide clients with scalable connection points beyond the capacity of a single machine, it would violate the basic objective of the multi-master architecture by connecting each session to the centralized GTM.

Second, even if the GTM may provide services for so many connections from a single session, it may also lose massive opportunities for enhancing efficiency. For example, it is assumed that there are K concurrent sessions executing read-only transactions on the same master node. The read-only transactions make no modifications or insertions of any data. If each session creates its own connection with the GTM and sends a distributed snapshot request from its own connection, the GTM will receive K such requests, calculate the K distributed snapshots and return K results. However, this is redundant and unnecessary. Instead, the GTM may take the first distributed snapshot calculated as a response to all K concurrent snapshot requests from the read-only transactions. If the master node could combine the K concurrent requests into one (meaning that the GTM only needs to calculate distributed snapshot once) and fetch the returned result, we may cut down the amount of network messages and the workload completed by GTM by K times and return them to K transactions. Even for different concurrent requests from the same master node (e.g., one session requesting global transaction ID and the other requesting distributed snapshot), it is more effective to send these requests in bulk than sending them separately via an individual connection.

However, for the above first problem, it may be believed in the related art that connectionless network protocols such as UDP and the like may overcome the connection limitations. However, it becomes more complicated to implement the system to ensure reliable communications with GTM. Besides, the UDP is of little help in addressing the second problem.

In the subsequent development of distributed data processing systems, Postgres-XL is a multi-master distributed database that also employs a centralized Global Transaction Manager (GTM). GTM in Postgres-XL is implemented as a multi-threaded independent process that is responsible for assigning transaction ID, tracking transaction state, and calculating distributed snapshot. The user database session on the master node may be directly connected to the GTM to request transaction ID, notify change of state or request distributed snapshot. Alternatively, the database may deploy a plurality of GTM proxy processes and enable the user database session to connect one of the GTM proxies. The GTM proxy forwards the request to the GTM server and sends a response back to the user session.

Accordingly, Postgres-XL improves the scalability of the centralized GTM with proxy modules. This also has four obvious deficiencies: firstly, the GTM proxy in Postgres-XL only supports TCP connections and communications with user database sessions on the master node. Even if the GTM proxy and the user database sessions are running on the same master node, they communicate with each other through TCP. This communication is less efficient than other shared memory based communication mechanisms due to additional memory copies and unnecessary network stack overheads. Secondly, in case of multiple GTM proxies, Postgres-XL fails to specify how the user database sessions are assigned to the GTM proxies in a load-balancing way. Thirdly, while receiving a plurality of concurrent requests simultaneously, the GTM proxy in Postgres-XL would package the requests into one message and send it to the GTM server, and decompress all responses returned from the GTM server. However, the GTM proxy in Postgres-XL would not detect or eliminate redundant concurrent requests (such as a plurality of distributed snapshot requests from concurrent read-only transactions). Fourthly, Postgres-XL would not allow a single database session to choose to connect to the GTM directly or via GTM proxy. Such setting is system-wide and cannot be changed dynamically without restarting the database system. This is not flexible and cannot support situations where multiple users need to connect to the GTM via different ways at the same time. For example, the database system may restrain database sessions of ordinary users from using the GTM proxy, but allow users of high priority or system administrator to handle urgent or maintenance tasks with GTM dedicated connections. The data processing method provided here, however, would allow an individual user session to dynamically choose to connect to the GTM directly or use GTM proxy. In comparison to Postgres-XL, such method would be more flexibly used and be a better service for mixed-use scenarios.

To sum up, the data processing method provided by embodiments of the present application is a proxy-based method to address scalability challenges of the centralized GTM in the multi-master distributed database. It is to be noted that the method proposed here is not limited to the particular distributed transaction protocol (e.g., Two-Phase Commit) and the concurrency control mechanism (such as Snapshot Isolation) used in the database, and instead it may be extensively applied to any multi-master distributed databases adopting the centralized transaction management.

In the present application, there is provided a data processing method. The present application meanwhile relates to a data processing system, a computing device and a computer-readable storage medium, which will be explained one by one in details in the following embodiments.

FIG. 2 illustrates a schematic diagram of an overall architecture 200 of a data processing system in accordance with one embodiment of the present application.

It is to be explained that the data processing method provided by embodiments of the present application proposes the use of a proxy module to improve durability and scalability of a centralized Global Transaction Manager (GTM) in the multi-master distributed database. In some implementations, the data processing system includes a data processing node, wherein the data processing node includes: a request receiving module configured to receive a plurality of data processing requests sent by a client, determine a target processing amount based on the number of the plurality of data processing requests, and limit the flow of the plurality of data processing requests in accordance with the target processing amount to obtain a target data processing request; and a proxy module configured to forward the target data processing request to a global transaction manager, receive a processing result from processing the target data processing request by the global transaction manager, and return the processing result to the client corresponding to each data processing request.

The overall architecture 200 of the distributed data processing system in FIG. 2 is a distributed database having two master database nodes, respectively being master node 1 (master 1) and master node 2 (master 2). Each master node corresponds to two clients, where the master node 1 corresponds to client 1 and client 2 respectively and the master node 2 corresponds to client 3 and client 4 respectively. Meanwhile, the data nodes corresponding to the two master nodes are data node 1, data node 2, data node 3 and data node 4 respectively. The multi-master distributed database architecture also has a Global Transaction Manager (GTM). It is to be explained that proxy module is configured in the master node 1 and the master node 2 respectively. Meanwhile, a module in the master node for receiving data processing requests sent from the client is communicatively linked with the proxy module through shared memory area.

In some implementations, each master node in the distributed database is equipped with a set of processes or threads of the proxy module. Each proxy module provides services on a master database node where it is deployed for one or more user database sessions. Each user database session may dynamically choose to connect to the GTM directly or indirectly via a proxy module on the same master database node. In case that the database session chooses to use a proxy and is required to send to the GTM a request (e.g., assigning global transaction ID or obtaining distributed snapshot), it will send the request to a corresponding proxy module and wait for its response. After at least one request from the user database session is received, the proxy module would establish a connection with the GTM if such connection is not created, and send the request issued by the user database session. The GTM processes every request and returns the response to the proxy module. For each response received from the GTM, the proxy module determines to which database session it belongs and sends the response to the database session. The proxy module and the user database session communicate via the efficient shared memory mechanism. For example, in case of multiple proxy modules, our method assigns the user sessions to the GTM proxy modules in a load-balancing way. The proxy modules would automatically detect and eliminate redundant requests to the GTM by concurrent transactions, to reduce the network traffic to the GTM and the workload executed by the GTM. Alternatively, this method allows an individual user session to dynamically choose to connect to the GTM directly or use GTM proxy module. Therefore, such method would be a better service for mixed-use scenarios.

The data processing system provided by embodiments of the present application, in a multi-master distributed database managed by a centralized global transaction manager, uses a proxy module configured in the master database node to limit the flow of the received data processing requests on the basis of an efficient shared memory mechanism. With multiple proxy modules provided, this system assigns the data processing requests to the proxy modules in a load-balancing way. Further, the proxy module assists the GTM in reducing the data redundancy requests and cutting down the network traffic to the global transaction management and the workload executed by the GTM. In some implementations, it also allows an individual user session to dynamically choose to connect to the GTM directly or use the GTM proxy module. Therefore, such system would be more flexible and a better service for mixed-use scenarios.

FIG. 3 illustrates a schematic diagram of a flow 300 of applying the data processing method provided by one embodiment of the present application to a data processing node of the distributed data processing system. The following detailed steps are included.

It is to be explained that the data processing method provided by this embodiment may be applied to any multi-master distributed database employing the centralized transaction management. No further limitations are made here.

Step 302: receiving a plurality of data processing requests sent by a client, determining a target processing amount based on the number of the plurality of data processing requests, and limiting the flow of the plurality of data processing requests in accordance with the target processing amount to obtain a target data processing request.

In some implementations, the data processing nodes of the distributed data processing system may be understood as the master nodes of the distributed database, i.e., data writing node that can read and write data, etc. In the related art, however, after receiving a plurality of data processing requests sent by a plurality of clients, the master node will directly forward the plurality of data processing requests to the global transaction manager for centralized transaction management, to perform subsequent data transactions. Since a plurality of data processing requests is directly connected with the global transaction manager, it may cause system breakdown due to an excessive amount of connections to the global transaction manager. For this, the data processing method provided by embodiments of the present application limits the flow of the plurality of data processing requests in the master node of the distributed database, to reduce the amount of data processing requests executed by the global transaction manager.

In some implementations, after receiving a plurality of data processing requests sent by the client, the master node of the distributed database determines a target processing amount to be processed at the same time in accordance with the number of the plurality of data processing requests, limits the flow of the above plurality of data processing requests based on the target processing amount and further selects the target data processing request. For example, in case that the master node of the distributed database receives 1000 data processing requests and it is determined, in accordance with the 1000 data processing requests, that the master node can only process 100 data processing requests at the same time, the 1000 data processing requests should be limited and only 100 data processing requests are obtained from the 1000 data processing requests by sequence of request as the target data processing request.

Before the master node of the distributed database receives a plurality of data processing requests from the client, the database system allows each individual user session to dynamically designate whether to execute the transactions in the session with proxy module or dedicated link to GTM. For example, before the receiving a plurality of data processing requests sent by a client, the method further includes: determining, by the request receiving module, whether to initiate a proxy module in the data processing node in accordance with a preset item requirement; if it is determined to initiate the proxy module in the data processing node, then sending a data processing instruction to the client, wherein the data processing instruction is an instruction of forwarding a request sent by the client to the proxy module for processing.

It is to be explained that the distributed database system may configure in the master node of the distributed database a proxy module that processes a plurality of data processing requests as a proxy, to improve the data processing capacity, reduce the transaction processing pressure on the global transaction manager and cut down the network traffic to the global transaction manager and the workload executed by the global transaction manager.

In some implementations, the request receiving module in the master node of the distributed database also may determine, in accordance with different item requirements, whether to initiate the proxy module configured in the master node. If it is determined, based on the item requirement, that a large amount of data processing requests are required to be processed, the request receiving module may agree on initiating the proxy module. The master node may send a data processing instruction to the client, wherein the data processing instruction is an instruction of forwarding the request sent by the client to the proxy module for processing.

In some implementations, when the database session dynamically changes its connection mode, it may follow one of the following two steps: if the database session is directly connected to the GTM for the time being and now chooses to use proxy, the connection with the GTM is closed and a shared memory communication slot is obtained to interact with the proxy. If the database session is currently using the shared memory communication slot and now chooses to directly connect to the GTM, it abandons the shared memory communication slot and establishes a new direct connection with the GTM. The database system would set up a quota or limitation to define what users or sessions may be directly connected to the GTM.

In some implementations, in the data processing method provided by embodiments of the present application, the distributed database processing system also may dynamically determine whether to use the proxy module configured in the master node in view of the actual item requirements, to further enhance the processing efficiency of the distributed data processing system. For example, the data processing node includes a request receiving module, a shared memory area and a proxy module; before the determining the target processing amount based on the number of the plurality of data processing requests, the method further includes: establishing a communication connection of the request receiving module with the proxy module based on the shared memory area.

It is to be explained that the master node of the distributed database includes a request receiving module, a proxy module and a shared memory area, wherein the proxy module is configured in the master node and the proxy module may limit the flow of the data processing requests on behalf of the master node.

In one embodiment, the request receiving module in the master node may establish a communication connection with the proxy module configured in the master node through the shared memory area, to subsequently facilitate the proxy module to obtain from the shared memory area the data processing requests sent by the request receiving module.

For the data processing method provided by the embodiments of the present application, in the multi-master distributed database employing the centralized global transaction manager, each master node may configure a proxy module for collecting, combining and forwarding the GTM requests from the user session on the master node and sending the returned response back to the client. The communication between the proxy module and the user session operates through the efficient shared memory mechanism on the master node, to improve the data processing efficiency.

In some implementations, a target processing amount of data processing requests to be processed by the proxy module at the same time may be determined based on the number of processing slots to be assigned in the shared memory area. For example, the determining the target processing amount based on the number of the plurality of data processing requests includes: determining, by the request receiving module, the number of processing slots to be assigned in the shared memory area based on the number of the plurality of data processing requests; and taking the number of processing slots to be assigned as a target processing amount.

In some embodiments, the distributed database system may assign a shared memory area for each master node, the shared memory area being dedicated for data exchange between user database sessions and proxy. If the database system is implemented using multiple threads in a single process, the shared memory area may be assigned on a heap memory accessible by all threads in the database system, including user database session thread and proxy thread. If the database system is implemented as multiple processes, the shared memory area may be assigned over a shared memory area provided by the underlying operating system and made available to multiple processes.

For example, the request receiving module in the master node may determine, based on the amount of the plurality of data processing requests received, the number of processing slots to be assigned to the plurality of data processing requests in the shared memory area. Under the initial state, the number of processing slots to be assigned indicates the number of data processing requests processed by the proxy module at the same time.

The data processing method provided by embodiments of the present disclosure determines the target processing amount in accordance with the number of processing slots to be assigned determined in the shared memory area, to facilitate the proxy module to subsequently limit the flow of the multiple data processing requests based on the target processing amount.

To enable the proxy module to limit the flow of the plurality of data processing requests, the data processing request may be placed in the processing slots of the shared memory area. For example, the limiting the flow of the plurality of data processing requests in accordance with the target processing amount to obtain the target data processing request includes: placing, by the request receiving module, data processing requests in an amount same as the target processing amount in processing slots to be assigned of the shared memory area in accordance with the target processing amount; and obtaining, by the proxy module, from the processing slots to be assigned data processing requests in an amount same as the target processing amount and taking the data processing requests as the target data processing request.

In some implementations, the request receiving module in the master node of the distributed database places data processing requests in an amount same as the target processing amount in processing slots to be assigned of the shared memory area in accordance with the determined target processing amount. The data processing requests that can be processed by the proxy module at the same time are in the processing slots to be assigned, to further limit the flow of the plurality of data processing requests. Afterwards, the proxy module may obtain from the slots to be processed the same number of data processing requests as the target processing amount and consider the obtained data processing requests as the target data processing request.

In the data processing method provided by embodiments of the present application, the data processing requests are placed into the processing slots to be assigned in the shared memory area and the proxy module obtains the data processing requests from the processing slots to be assigned, to limit the flow of the plurality of data processing requests and improve the data processing efficiency of the distributed data processing system.

Figure 4:
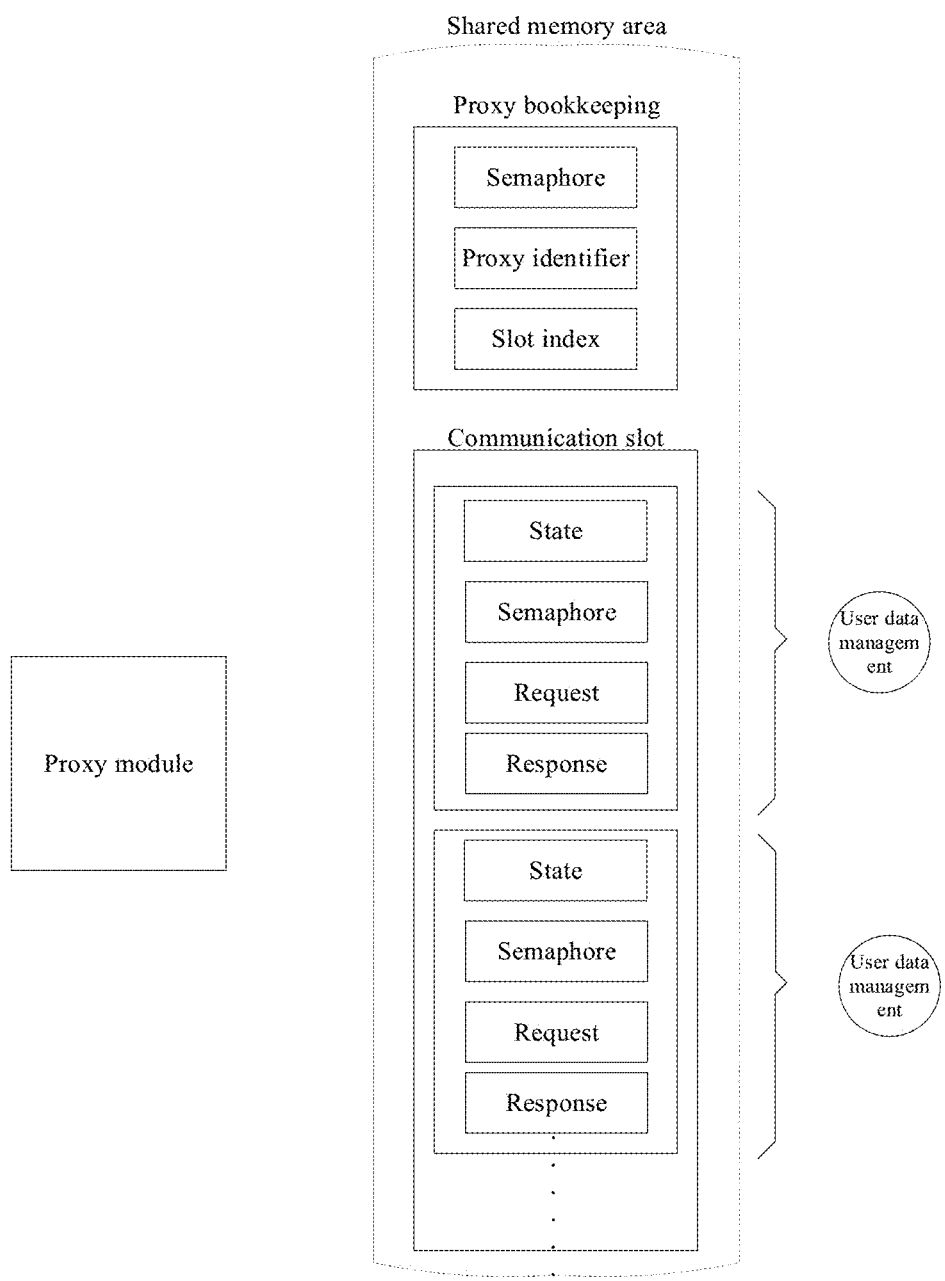
FIG. 4 illustrates a schematic structural diagram of a shared memory area of the data processing method provided by one embodiment of the present application.

Based on the above detailed processing of limiting the flow of the plurality of data processing requests by the proxy module, embodiments of the present application provide a structural diagram of the shared memory area communicating with the proxy module in the data processing method. FIG. 4 illustrates a schematic diagram of the structure 400 of the shared memory area of the data processing method provided by one embodiment of the present application.

In FIG. 4, the shared memory area includes two parts, one of which is a set of communication slots. Each of the communication slots is assigned to one user database session and the user database session exchanges GTM request and response with the proxy. The other part is a proxy bookkeeping. One proxy module uses each cell of an array to track various states. The amount of communication slots is configured in accordance with a maximum number of user database sessions on a single master node, so as to ensure that every user database session has a dedicated shared memory communication slot.

In some implementations, the shared memory area may have many processing slots. However, the processing slots could not be used until being configured. The configuration process is performed at given resource costs. As such, the effective way to save resource costs is to figure out how to efficiently utilize the already configured processing slots. Further, the method adopted by embodiments of the present application includes determining a state of the processing slot in accordance with semaphore in the processing slot and deciding whether the processing slot is being occupied. After the proxy module obtains the data processing request from the processing slot, the processing slot recovers to an idle state and a next data processing request may be assigned to the processing slot. For example, the request receiving module placing data processing requests in an amount same as the target processing amount in processing slots to be assigned of the shared memory area in accordance with the target processing amount includes: determining, by the request receiving module based on the target processing amount, semaphore of each processing slot to be assigned in the shared memory area; placing data processing requests in an amount same as the target processing amount in processing slots to be assigned of the shared memory area in accordance with the semaphore and modifying communication state of the processing slots to be assigned.

It is to be explained that the proxy module uses the semaphore to notify the user database session of information concerned with change of slot state. For example, the proxy module uses semaphore to wake up user sessions waiting for a response to be prepared. It is to be noted that semaphore may vary in every data exchange procedure. For example, the proxy module and the user database session are separate processes, which may be implemented through calling by POSIX semaphore system. Alternatively, if the proxy module and the user database session are different threads in the same process, they may be implemented as pthead condition variable.

In one embodiment, the request receiving module of the master node of the distributed database determines, based on the target processing amount, semaphore of each processing slot to be assigned in the shared memory area; and places data processing requests in an amount same as the target processing amount in processing slots to be assigned of the shared memory area in accordance with the semaphore. Meanwhile, it is also required to modify communication state of the processing slots to be assigned to facilitate subsequently determining whether the data processing requests can be placed in the processing slots in accordance with the communication state of the processing slot to be assigned.

Figure 5:
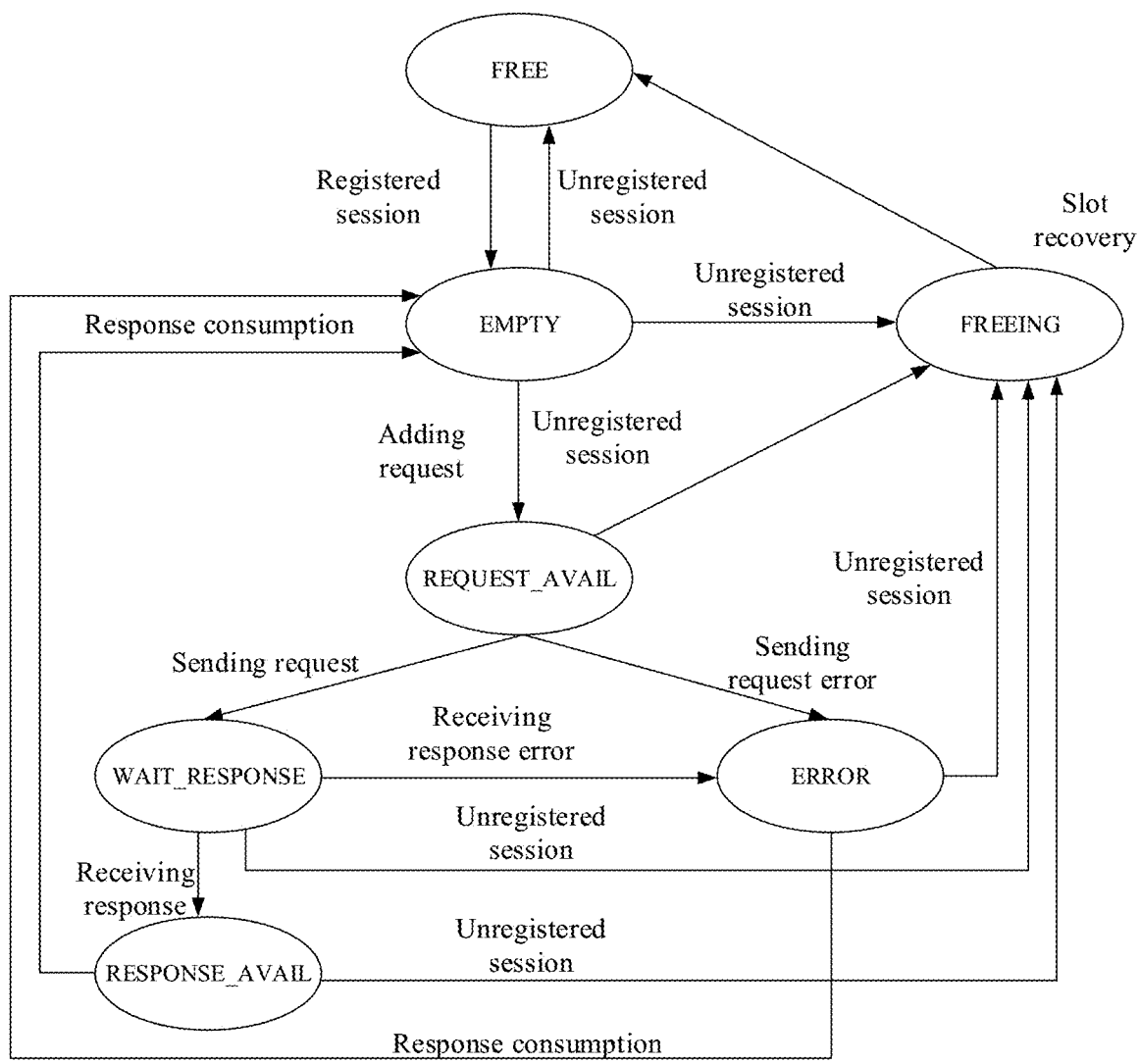
FIG. 5 illustrates a schematic diagram of state conversion of processing slots in the shared memory area of the data processing method provided by one embodiment of the present application.

In some implementations, slot state indicates a current state of the slot. During communications between the user database session and the proxy module, the slot may convert between different states. FIG. 5 illustrates a schematic diagram of various state conversions 500 of the processing slots in the shared memory area of the data processing method provided by embodiments of the present application.

FIG. 5 is a schematic diagram showing conversion 500 of various slot states, including FREE (the slot not used by any user database session), EMPTY (the slot has already been assigned to the user database session, but no request have been stored in it), REQUEST_AVAIL (the request has been stored in the slot), WAIT_RESPONSE (the proxy has sent a request to GTM and is currently waiting for a response from GTM), RESPONSE_AVAIL (a response to an uncompleted request has been stored in the slot, which is ready for reception by the user database session), ERROR (error occurs when serving the current request) and FREEING (the slot has been abandoned by the database session and is ready for recovery).

For example, the procedure of obtaining the shared memory communication slot by the user database session, the procedure of abandoning the communication slot by the user database session and the procedure of sending a request and receiving a response by the user database session via the shared memory communication slot may explain the procedure of slot state conversion.

In one embodiment, the procedure of obtaining the shared memory communication slot by the user database session includes: step 1: obtaining an exclusive lock of the communication slot array; step 2: traversing the communication slot array and finding slots in FREE state; if found, executing step 3; if not, executing step 7; step 3: changing the slot state into EMPTY; step 4: assigning a proxy in accordance with the load balancing strategy to be described below to serve the slot and adding an array index of the slot into a slot indexed array of the proxy; step 5: removing the exclusive lock of the communication slot array; step 6: arranging a callback function that is executed at the end of the session to abandon the obtained slots; step 7: returning success or failure to obtain the communication slot.

In one embodiment, once the communication slot is obtained, the user database session will continue using it until the session is over. The procedure of abandoning the communication slot by the user database session includes: step 1: changing the slot state into FREEING; and step 2: setting up semaphore in the bookkeeping data of the corresponding proxy, notifying the proxy of changes of the slot state; and recovering by the proxy the processing slot.

In one embodiment, the procedure of sending a request and receiving a response by the user database session via the shared memory communication slot includes: step 1: storing the request into Request buffer of the communication slot, the request being formatted and serialized into a continuous byte sequence, and the index of the communication slot being stored as a part of the request; step 2: changing the slot state into REQUEST_AVAIL; step 3: setting up semaphore in the bookkeeping data of the corresponding proxy and notifying the proxy of arrival of a new request; step 4: waiting for the semaphore in the communication slot to obtain a notification from the proxy; and step 5: after receiving Semaphore notification from the proxy module, checking the slot state: (1) if the slot state is RESPONSE_AVAIL, it indicates there is a response in the Response buffer of the slot; in such case, the slot state is changed into EMPTY and a response is returned; (2) the slot state, if being ERROR, is changed into EMPTY and an error is returned; and (3) if the slot state is REQUEST_AVAIL or WAIT_RESPONSE, the procedure returns to step 4 and continue waiting.

It is to be explained that the data processing request is a relatively large buffer area that may store a single request for GTM. When the user database session needs to issue a request to GTM, it may construct a request and store the request in the buffer area. Afterwards, the proxy module reads the request from the buffer area and sends it to the GTM for processing. The user database session may format the request and serialize it into a particular format. However, another buffer area for data response can store a single response from the GTM. When receiving a response from GTM, the proxy module stores the response into the buffer area and notifies the user database session of availability of the response through slot semaphore. The shared memory communication slot array is protected by Read/Write lock, which lock also resides in the shared memory area. When the user database session is required to obtain a slot, it may obtain the lock in write (or exclusive) mode and select an idle slot for use. Each proxy scans the communication slot repeatedly to find uncompleted request and time slots which have been abandoned by the database session and should be recovered. Prior to scan, the proxy obtains the lock in read (or shared) mode.

The data processing method provided by embodiments of the present application may determine the current state of the slot through semaphore and subsequently record the communication state of the slot to efficiently assign the data processing requests and facilitate subsequent promoting the processing efficiency of the data processing requests.

In addition, the shared memory area also has a bookkeeping data portion that records the state of the corresponding proxy module, e.g., the proxy module is in connected or disconnected state. Meanwhile, the index data of the slot may also be recorded, such as how many slots are being used and how many slots are idle. That is, the bookkeeping data in the shared memory area record the state of the proxy module per se. For example, the request receiving module placing data processing requests in an amount same as the target processing amount in processing slots to be assigned of the shared memory area in accordance with the target processing amount also includes: recording, by the request receiving module, a state of the processing slots to be assigned in a proxy bookkeeping of the shared memory area in accordance with the data processing requests in an amount same as the target processing amount and, recording a connection state of the proxy module.

In some implementations, the proxy bookkeeping may be understood as bookkeeping data (per-proxy Data) and the number of cells in the bookkeeping data is configured in accordance with the amount of proxy modules on the master node. The bookkeeping data of each proxy module include following fields: the user database session uses the semaphore to notify the proxy module of arrival of a new data processing request or abandon of communication slot; upon receipt of the notification, the proxy module starts to scan the communication time sequence for operation; proxy identification (proxy_id) is a unique identifier for the proxy that possesses the bookkeeping data; index data of the slot is an indexed array of the communication slot served by the proxy module; when there are multiple proxy modules on the master node, each proxy module serves one slot subset, and the slots are identified with slot indexed array.

In one embodiment, the request receiving module records a state of the processing slots to be assigned in a proxy bookkeeping of the shared memory area in accordance with the data processing requests in an amount same as the target processing amount and meanwhile also records a connection state of the proxy module.

The data processing method provided by embodiments of the present application records slot states and proxy module states in the proxy bookkeeping of the shared memory area, to reduce the conflicts of concurrent access and cut down the resource overheads in view of the state conversion and recording.

Step 304: forwarding the target data processing request to a global transaction manager, receiving a processing result from processing the target data processing request by the global transaction manager, and returning the processing result to the client corresponding to each data processing request.

In some implementations, the distributed data processing nodes forward the determined target data processing request to the global transaction manager, which global transaction manager processes the data processing requests and then returns to the distributed data processing nodes a processing result of the target data processing request. The processing result is returned to the corresponding client of each data processing request.

For example, the forwarding the target data processing request to the global transaction manager includes: upon determining that a communication connection has been established with the global transaction manager, forwarding, by the proxy module, the target data processing request to the global transaction manager based on the communication connection.

In one implementation, upon determining that a communication connection has been established with the global transaction manager, the proxy module in the master node of the distributed database forwards the target data processing request to the global transaction manager through the communication connection.

When it is determined that the type of the target data processing request is a distributed snapshot request, the request receiving module also may receive a result of calculating the distributed snapshot request returned from the global transaction manager. For example, the forwarding the target data processing request to the global transaction manager and receiving a processing result from processing the target data processing request by the global transaction manager includes: upon determining that the target data processing request is a distributed snapshot request, forwarding, by the request receiving module, the distributed snapshot request to the global transaction manager; and receiving, by the request receiving module, a result of calculating each distributed snapshot request by the global transaction manager.

In one embodiment, after determining that the target processing request is a distributed snapshot request, the request receiving module sends the distributed snapshot request to the GTM, which GTM processes the request by calculating the distributed snapshot and replies to the proxy module with a response that contains the distributed snapshot and the slot index list included in the combined request. Upon receipt of the response, the proxy module stores a copy of the distributed snapshot into a response buffer area of each communication slot included in the response.

In one embodiment, the present embodiment also supports forwarding the distributed snapshot request to the global transaction manager with a hybrid communication mode. Step 1: the proxy is provided with a set of new requests in communication slots in a waiting queue and further checks them to find all requests of obtaining the distributed snapshot initiated for read-only transactions and requests of obtaining transaction ID initiated for any transactions. Step 2: if the set of transactions being processed contains a plurality of requests of obtaining the distributed snapshot initiated for read-only transactions, the proxy will combine them to create a new joint request. The new joint request is still in the type of distributed snapshot request and includes a slot index list indicating from which communication slot each original request is originated. The proxy will send the new joint request to the GTM, and the GTM calculates the distributed snapshot and returns the calculated distributed snapshot along with the received slot index list to the proxy as response. After receiving the response from GTM, the proxy copies the distributed snapshot in the message to a result data buffer area of a communication slot denoted by each slot index. Step 3: likewise, if the set of transactions being processed contains a plurality of requests of obtaining the transaction ID, the proxy will also combine them to create a new joint request. The new joint request is still in the type of global transaction ID request and meanwhile contains a slot index list indicating from which communication slot each original request is originated. After the joint request is sent to GTM, the GTM assigns a set of consecutive transaction IDs and returns scope information about the set of consecutive transaction IDs and the slot index list to the proxy. Upon receipt of the response, the proxy writes each transaction ID within the scope one by one into the data buffer area of each index denoted by the slot index list.

In a further implementation, a plurality of proxy modules may also be configured in the master node in the distributed database. For example, the request receiving module establishing a communication connection with the proxy module based on the shared memory area includes: determining, by the request receiving module, two or more proxy modules in an amount same as the preset amount based on a preset amount, and establishing a communication connection with the two or more proxy modules based on the shared memory area.

In one embodiment, the number of proxy modules on the master node may be configured. In case of multiple proxies, our approach is to assign the user sessions to GTM proxies in a load balancing way. Assuming that each master server has K proxies, every time the user database session is required to obtain the communication slot, it starts scanning the communication slot array from the beginning (i.e., first slot position in the array) to find time slots in idle state. Then, it is determined through calculation which proxy serves this slot: proxy id=slot index modulo K (i.e., proxy amount). In other words, the slot is assigned to the proxy in a static loop way. This assignment is simple and deterministic, and in general, the work is equally assigned to the proxy. A more complicated alternative assignment strategy is also feasible. For example, the session may check and compare the length of the slot indexed array of the proxy and choose the one that serves the minimum number of slots.

In one embodiment, in case of multiple proxy modules, this embodiment proposes a load-balancing method for assigning user sessions to the multiple proxy modules. For example, the forwarding the target data processing request to the global transaction manager includes: assigning, by the request receiving module, the target data processing request to the two or more proxy modules in accordance with a preset load balancing mechanism, and forwarding, by the proxy module, the target data processing request to a global transaction manager.

In one embodiment, after the request receiving module assigns the target data processing request to the two or more proxy modules in accordance with a preset load balancing mechanism, the proxy module will automatically detect and eliminate redundant requests to the GTM by concurrent transactions, to reduce the network traffic to the GTM and the workload executed by the GTM. The proxy checks two types of concurrent requests which may be considered redundant since they may provide service together. The first type is distributed snapshot request from concurrent read-only transactions. The GTM may calculate a single distributed snapshot and return it as a response to all these requests. As such, the proxy first displays a plurality of concurrent distributed snapshot requests as a single combined message, sends it to the GTM and returns a copy of the response to each requesting transaction after receiving the response. The second type is requesting global transaction ID from concurrent transactions. The GTM may return a continuous range of global transaction IDs, rather than assigning an individual ID to each transaction and having the proxy process one for each requesting transaction.

The procedure of downsizing and grouping the messages through the proxy module is explained as follows. Step 1: the proxy is provided with a set of new requests in communication slots in a waiting queue and further checks them to find all requests of obtaining the distributed snapshot initiated for read-only transactions and requests of obtaining transaction ID initiated for any transactions. Step 2: if the set of transactions being processed contains a plurality of requests of obtaining the distributed snapshot initiated for read-only transactions, the proxy will combine them to create a new joint request. The new joint request is still in the type of distributed snapshot request and includes a slot index list indicating from which communication slot each original request is originated. The proxy will send the new joint request to the GTM, and the GTM calculates the distributed snapshot and returns the calculated distributed snapshot along with the received slot index list to the proxy as response. After receiving the response from GTM, the proxy copies the distributed snapshot in the message to a result data buffer area of a communication slot denoted by each slot index. Step 3: likewise, if the set of transactions being processed contains a plurality of requests of obtaining the transaction ID, the proxy will also combine them to create a new joint request. The new joint request is still in the type of global transaction ID request and meanwhile contains a slot index list indicating from which communication slot each original request is originated. After the joint request is sent to GTM, the GTM assigns a set of consecutive transaction IDs and returns scope information about the set of consecutive transaction IDs and the slot index list to the proxy. Upon receipt of the response, the proxy writes each transaction ID within the scope one by one into the data buffer area of each index denoted by the slot index list.

In one embodiment, each proxy module provides services for one or more user database sessions through communication slots, wherein the workflow of the proxy module is as follows. Step 1: waiting for the semaphore of the proxy bookkeeping data to obtain a notification from the user database session. After receipt of the notification, switch to step 2 of obtaining a shared lock on the communication slot array. Step 3: scanning each slot and record respective index into the slot index array of the proxy. These are slots that provide services for the proxy. For each of such slots, its state is checked. If the state is FREEING, the slot is added into a list named freeing_slots; if the state is REQUEST_AVAIL, the slot is added into a further list named pending_requests. Step 4: for each slot in the freeing_slots list, recovering this slot by changing its state into FREE, or deleting this slot from the slot index array of the proxy. Step 5: removing the lock over the communication slot array. Step 6: sending a request from the slot in the pending_requests list; step 6.1: if there are multiple pending processing requests, they are combined into one or more combined requests and the combined messages are sent to the GTM; otherwise, a single request is sent to the GTM. The details for creating a combined request are to be described below. After the request is sent, the slot state is changed to WAIT_RESPONSE. If the proxy fails to send the request, the state of the corresponding slot is changed to ERROR and this slot is deleted from the pending_requests list. A connection is reestablished with the GTM and the workflow goes to step 1. Step 6.2: receiving a response from GTM, where the GTM may return a combined response corresponding to a plurality of requests or a single response. A single response may be built from the combined response. Each response is stored into a response buffer area of the corresponding communication slot and the slot state is changed to RESPONSE_AVAIL. If the proxy fails to receive the response from GTM (e.g., due to network disconnection or GTM failure), the state of the corresponding slot is set to ERROR. Once the state of the slot is changed to RESPONSE_AVAIL or ERROR, the slot semaphore is configured to notify the database session and the slot is removed from the pending_requests list. When the pending_requests list is null, the workflow goes to step 1.

On this basis, the database session and the proxy modify the slot state through atomic instructions (such as comparison and exchange). It should be noted that the recovery of one slot is completed by two steps. The session sets the slot state to FREEING and the proxy afterwards recovers it and set its state to FREE. Such arrangement reduces conflicts between concurrent accesses to the communication slot array and further cuts down the locking overheads.

In summary, for the data processing method provided by the embodiments of the present application, in the multi-master distributed database employing the centralized global transaction manager, each master node may configure more than one proxy modules for collecting, combining and forwarding the GTM requests from the user session and routing the returned response back to the user session. The communication between the proxy module and the user session operates through the efficient shared memory mechanism on the master node, and the number of proxy modules on one master is configurable. In case of multiple proxy modules, our method assigns the user sessions to the proxy modules in a load-balancing way. The proxy would automatically detect and eliminate redundant requests to the GTM by concurrent transactions, to reduce the network traffic to the GTM and the workload executed by the GTM. The database system allows each individual user session to dynamically assign whether to execute the transactions in the session through proxy or dedicated connection to the GTM.

Figure 6:
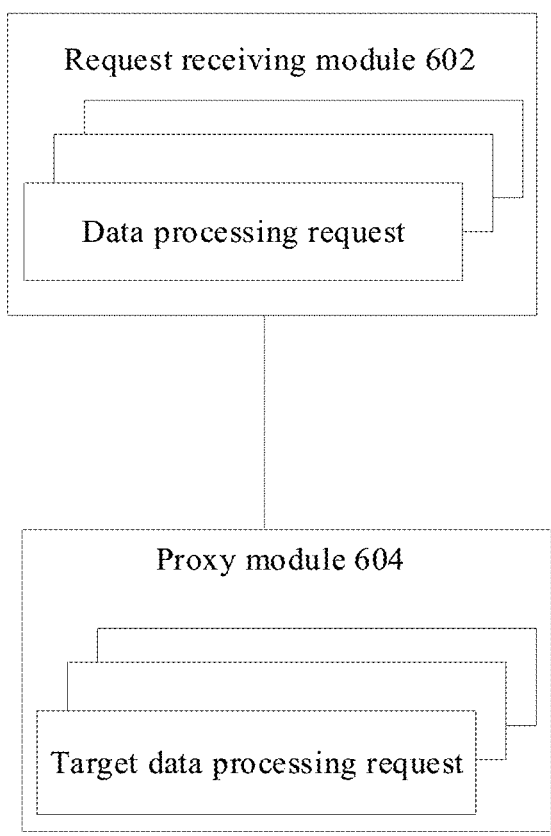
FIG. 6 illustrates a schematic structural diagram of a data processing apparatus provided by one embodiment of the present application.

The present application also provides an embodiment of data processing apparatus corresponding to the above method embodiment. FIG. 6 illustrates a schematic structural diagram of a data processing apparatus 600 provided by one embodiment of the present application. As shown, the apparatus 600 is applied to data processing nodes of a distributed data processing system, including: a request receiving module 602 configured to receive a plurality of data processing requests sent by a client, determine a target processing amount based on the number of the plurality of data processing requests, and limit the flow of the plurality of data processing requests in accordance with the target processing amount to obtain target data processing request; a proxy module 604 configured to forward the target data processing request to a global transaction manager, receive a processing result from processing the target data processing request by the global transaction manager, and return the processing result to the client corresponding to each data processing request In one embodiment, the request receiving module 602 is further configured to establish a communication connection with the proxy module based on the shared memory area.

In one embodiment, the request receiving module 602 is further configured to determine the number of processing slots to be assigned in the shared memory area based on the number of the plurality of data processing requests and use the number of processing slots to be assigned as a target processing amount.

In one embodiment, the request receiving module 602 is further configured to place data processing requests in an amount same as the target processing amount in processing slots to be assigned of the shared memory area in accordance with the target processing amount.

In one embodiment, the proxy module 604 is further configured to obtain from the processing slots to be assigned data processing requests in an amount same as the target processing amount and take the data processing requests as the target data processing request.

In one embodiment, the proxy module 604 is further configured to forward the target data processing request to the global transaction manager based on the communication connection, upon determining that a communication connection has been established with the global transaction manager.

In one embodiment, the request receiving module 602 is further configured to determine, based on the target processing amount, semaphore of each processing slot to be assigned in the shared memory area; place data processing requests in an amount same as the target processing amount in processing slots to be assigned of the shared memory area in accordance with the semaphore; and modify communication state of the processing slots to be assigned.

In one embodiment, the request receiving module 602 is further configured to record a state of the processing slots to be assigned in a proxy bookkeeping of the shared memory area in accordance with the data processing requests in an amount same as the target processing amount and also record a connection state of the proxy module.

In one embodiment, the request receiving module 602 is further configured to forward, upon determining the target data processing request is a distributed snapshot request, the distributed snapshot request to the global transaction manager.

In one embodiment, the request receiving module 602 is further configured to receive a result of calculating each distributed snapshot request by the global transaction manager.

In one embodiment, the request receiving module 602 is further configured to determine, based on a preset amount, two or more proxy modules in an amount same as the preset amount; and establish a communication connection with the two or more proxy modules based on the shared memory area.

In one embodiment, the request receiving module 602 is further configured to assign the target data processing request to the two or more proxy modules in accordance with a preset load balancing mechanism, and the proxy module forwards the target data processing request to a global transaction manager.

In one embodiment, the request receiving module 602 is further configured to determine whether to initiate a proxy module in the data processing node in accordance with a preset item requirement; if it is determined to initiate the proxy module in the data processing node, then send a data processing instruction to the client, wherein the data processing instruction is an instruction of forwarding a request sent by the client to the proxy module for processing.

The data processing apparatus provided by embodiments of the present application limits the flow of the plurality of data processing requests received from the client in the data processing nodes and processes all data processing requests sent by the client by batch in accordance with a given amount of data processing requests, so as to decrease the request processing pressure on the data processing nodes. Besides, the apparatus subsequently forwards the target data processing request to the global transaction manager to improve the processing efficiency of the global transaction manager and enhance the processing performance of the overall distributed data processing system.

The above is a schematic scheme of the data processing apparatus according to embodiments of the present application. It is to be explained that the technical solution of the data processing apparatus and the above technical solution concerned with the data processing method belong to the same concept. The details not depicted in the technical solution of the data processing apparatus may refer to the above contents of the technical solution concerned with the data processing method.

Figure 7:
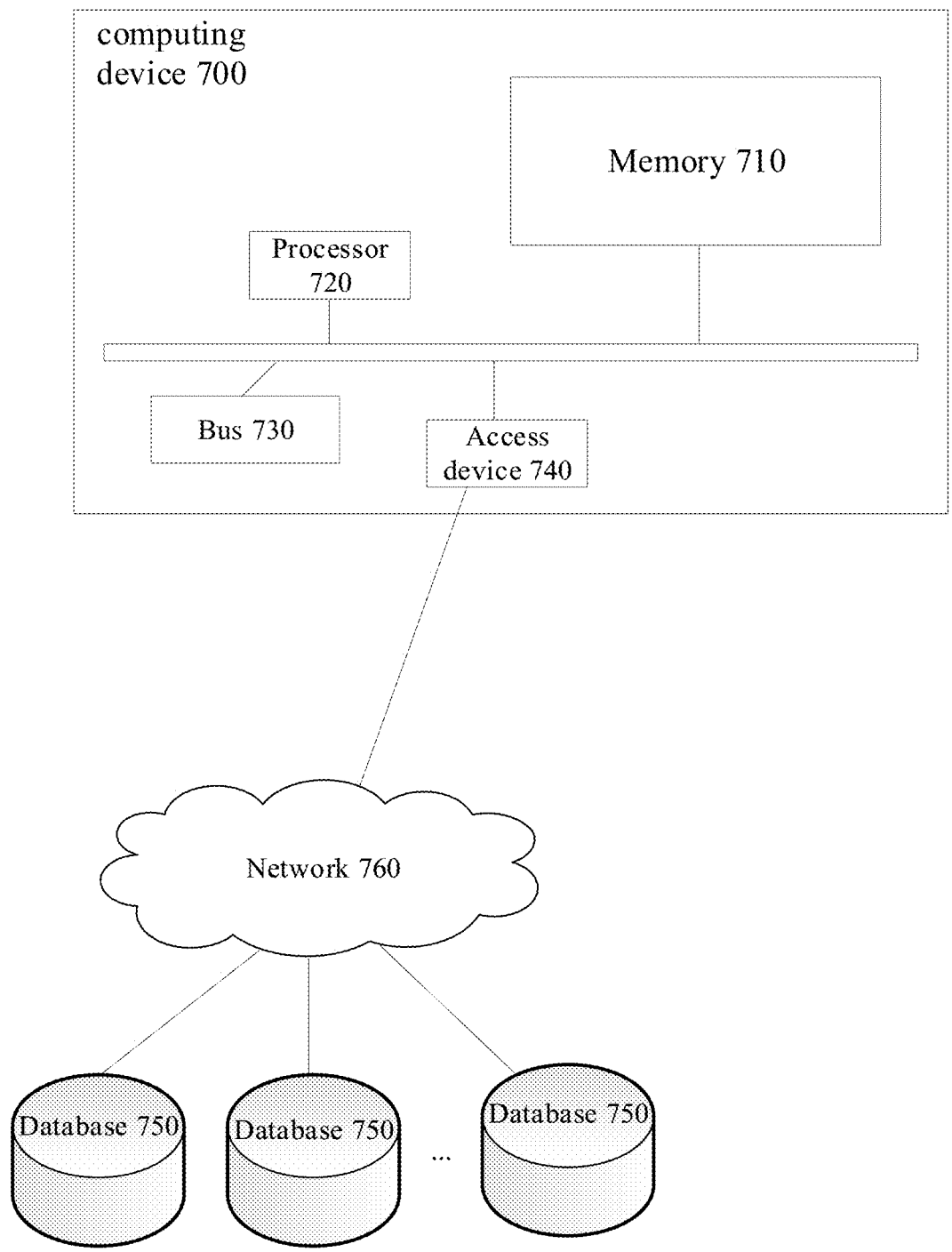
FIG. 7 illustrates a structural block diagram of a computing device provided by one embodiment of the present application.

FIG. 7 illustrates a structural diagram of a computing device 700 provided by one embodiment of the present application. Components of the computing device 700 include, but not limited to, a memory 710 and a processor 720. The processor 720 is connected with the memory 710 via a bus 730 and a database 750 is provided for saving data.

The computing device 700 also includes an access device 740 that enables the computing device 700 to communicate via one or more networks 760. Examples of the network include a combination of Public Switched Telephone Network (PSTN), Local Area Network (LAN), Wide Area Network (WAN), Personal Area Network (PAN), or a communication network such as the Internet. The access device 740 may include one or more of any types of network interfaces, wired or wireless (e.g., one or more of Network Interface Card (NIC)), such as IEEE802.11 Wireless Local Area Network (WLAN) wireless interface, Worldwide Interoperability for Microwave Access (Wi-MAX) interface, Ethernet interface, Universal Serial Bus (USB) interface, cellular network interface, Bluetooth interface, and Near Field Communication (NFC) interface etc.

In one embodiment of the present application, the above components of the computing device 700 and other components not shown in FIG. 7 also may be connected with each other, e.g., via bus. It is to be understood that the structural diagram of the computing device shown in FIG. 7 is provided merely as an example, rather than restricting the scope of the present application. Those skilled in the art may add or substitute other components as required.

The computing device 700 may be stationary or mobile computing device of any types, including mobile computer or mobile computing device (e.g., tablet computer, personal digital assistant, laptop computer, notebook computer and netbook etc.), mobile phone (such as smartphone), wearable computing device (e.g., smart watch and smart glasses etc.) or mobile devices of other types, or stationary computing device for example of desktop computer or PC. The computing device 700 also may be mobile or stationary server.

The processor 720 may be used for executing following computer-executable instructions, wherein the processor 720 implements steps of the above data processing method while performing the computer-executable instructions.

The above illustrates a schematic scheme of one computing device according to embodiments of the present application. It is to be explained that the technical solution of the computing device and the above technical solution of the data processing method belong to the same inventive concept. The details not depicted in the technical solution of the computing device may refer to the above contents of the technical solution concerned with the data processing method.

One embodiment of the present application also provides a computer readable storage medium stored with computer executable instructions, wherein the computer executable instructions, when executed by the processor, implement steps of the above data processing method.

The above illustrates a schematic scheme of one computer readable storage medium according to embodiments of the present application. It is to be explained that the technical solution of the storage medium and the above technical solution of the data processing method belong to the same inventive concept. The details not depicted in the technical solution of the storage medium may refer to the above contents of the technical solution concerned with the data processing method.

The data processing method provided by one embodiment of the present application, applied to data processing nodes of the distributed data processing system, includes: receiving a plurality of data processing requests sent by a client, determining a target processing amount based on the number of the plurality of data processing requests, and limiting the flow of the plurality of data processing requests in accordance with the target processing amount to obtain a target data processing request; forwarding the target data processing request to a global transaction manager, receiving a processing result from processing the target data processing request by the global transaction manager, and returning the processing result to a client corresponding to each data processing request. For example, the data processing method limits the flow of the plurality of data processing requests received from the client in the data processing nodes and processes all data processing requests sent by the client by batch in accordance with a given amount of data processing requests, so as to decrease the request processing pressure on the data processing nodes. Besides, the method subsequently forwards the target data processing request to the global transaction manager to improve the processing efficiency of the global transaction manager and enhance the processing performance of the overall distributed data processing system.

Particular embodiments of the present application have been described above. Other embodiments are within the scope of the attached claims. In some cases, acts or steps disclosed in the claims may be executed according to a sequence different from the one described in embodiments and the desired results may still be achieved. Further, the procedure described in the drawings, when performed in a sequence different from the illustrated one or not consecutively as described, can also achieve the expected results. In some implementations, multitasking and parallel processings are also feasible or possibly favorable.

The above computer instructions include computer program codes, and the computer program codes may be in source code form, object code form, executable file form or some intermediate form etc. The computer readable medium may include: any entities or apparatuses, recording medium, USB flash drive, mobile hard disk, magnetic disc, optical disc, computer memory, Read-Only Memory (ROM), Random Access Memory (RAM), electric carrier signal, telecommunication signal and software distribution medium etc, carrying the computer program codes. It is to be explained that contents included in the computer readable medium may be appropriately added or removed in accordance with legislation within the jurisdiction and requirements of patent in practice. For example, under certain jurisdictions, the computer readable medium may not include electric carrier signal and telecommunication signal in accordance with the legislation and patent in practice.

It should be explained that the aforementioned method embodiments describe a series of act combinations just for the sake of description. However, those skilled in the art should understand that embodiments of the present application are not restricted to the sequence of the described acts. According to the embodiments of the present application, some steps may be carried out in a different sequence or at the same time. Then, those skilled in the art should also appreciate that the described embodiments of the present application are preferred embodiments, and the involved acts and modules are not prerequisite for the embodiments of the present application.

The above description of the various embodiments may have different focus. However, some omitted parts in one embodiment may be found in a further embodiment.

The above embodiments of the present application are described only for explaining the present application. Optional embodiments are not depicted in an exhaustive way, and the present invention should not be restricted to the specific implementations of the present application. Apparently, many modifications and changes may be made in accordance with contents of embodiments of the present application. The present application chooses some embodiments and further describes them in details, so as to provide a better understanding of the principle and practical application of the embodiments of the present application. As such, those skilled in the art may understand and further utilize the present application in a better way. The present application is only restricted to the claims, the full scope of the claims and equivalents.

What is claimed is:

1. A data processing method, applied to a data processing node of a distributed data processing system, wherein the data processing node comprises a request receiving module, a shared memory area and a proxy module, the method comprises:
utilizing a memory and a processor, wherein the memory is provided for storing computer executable instructions and the processor is used for executing the computer executable instructions to perform operations of:
receiving a plurality of data processing requests sent by a client, determining a target processing amount based on the number of the plurality of data processing requests, and limiting a flow of the plurality of data processing requests in accordance with the target processing amount to obtain a target data processing request, wherein the target data processing request is data processing requests obtained, by the proxy module, from processing slots to be assigned in an amount same as the target processing amount, and the data processing requests in the processing slots to be assigned are placed, by the request receiving module, in the processing slots to be assigned of the shared memory area;
forwarding the target data processing request to a global transaction manager, receiving a processing result from processing the target data processing request by the global transaction manager, and returning the processing result to the client corresponding to each data processing request, wherein the target data processing request is a distributed snapshot request, and the processing result is a result, received by the request receiving module, of calculating the distributed snapshot request by the global transaction manager.

2. The data processing method of claim 1,
before the determining the target processing amount based on the number of the plurality of data processing requests, the data processing method further comprises:
establishing a communication connection of the request receiving module with the proxy module based on the shared memory area.

3. The data processing method of claim 2, wherein the determining the target processing amount based on the number of the plurality of data processing requests comprises:
determining, by the request receiving module, the number of processing slots to be assigned in the shared memory area based on the number of the plurality of data processing requests, and taking the number of processing slots to be assigned as the target processing amount.

4. The data processing method of claim 3, wherein the limiting the flow of the plurality of data processing requests in accordance with the target processing amount to obtain the target data processing request comprises:
placing, by the request receiving module, data processing requests in an amount same as the target processing amount in processing slots to be assigned of the shared memory area in accordance with the target processing amount;
obtaining, by the proxy module, from the processing slots to be assigned data processing requests in an amount same as the target processing amount, and taking the data processing requests as the target data processing request.

5. The data processing method of claim 2, wherein the forwarding the target data processing request to the global transaction manager comprises:
upon determining that a communication connection has been established with the global transaction manager, forwarding, by the proxy module, the target data processing request to the global transaction manager based on the communication connection.

6. The data processing method of claim 4, wherein the placing, by the request receiving module, data processing requests in an amount same as the target processing amount in processing slots to be assigned of the shared memory area in accordance with the target processing amount comprises:
determining, by the request receiving module based on the target processing amount, semaphore of each processing slot to be assigned in the shared memory area;
placing data processing requests in an amount same as the target processing amount in processing slots to be assigned of the shared memory area in accordance with the semaphore, and modifying communication state of the processing slots to be assigned.

7. The data processing method of claim 6, after placing, by the request receiving module, data processing requests in an amount same as the target processing amount in processing slots to be assigned of the shared memory area in accordance with the target processing amount, further comprising:
recording, by the request receiving module, a state of the processing slots to be assigned in a proxy bookkeeping of the shared memory area in accordance with the data processing requests in an amount same as the target processing amount, and recording a connection state of the proxy module.

8. The data processing method of claim 7, wherein the forwarding the target data processing request to the global transaction manager and receiving the processing result from processing the target data processing request by the global transaction manager comprises:
upon determining that the target data processing request is a distributed snapshot request, forwarding, by the request receiving module, the distributed snapshot request to the global transaction manager;
receiving, by the request receiving module, a result of calculating each distributed snapshot request by the global transaction manager.

9. The data processing method of claim 2, wherein the establishing a communication connection of the request receiving module with the proxy module based on the shared memory area comprises:
determining, by the request receiving module, two or more proxy modules in an amount same as the preset amount based on a preset amount, and establishing a communication connection with the two or more proxy modules based on the shared memory area.

10. The data processing method of claim 9, wherein the forwarding the target data processing request to the global transaction manager comprises:
assigning, by the request receiving module, the target data processing request to the two or more proxy modules in accordance with a preset load balancing mechanism, and forwarding, by the proxy module, the target data processing request to the global transaction manager.

11. The data processing method of claim 10, before the receiving the plurality of data processing requests sent by the client, further comprising:
determining, by the request receiving module, whether to initiate a proxy module in the data processing node in accordance with a preset item requirement; if it is determined to initiate the proxy module in the data processing node, then sending a data processing instruction to the client, wherein the data processing instruction is an instruction of forwarding a request sent by the client to the proxy module for processing.

12. A data processing system comprising a data processing node, wherein the data processing node comprises a request receiving module, a shared memory area and a proxy module, and further comprises:
  a memory and a processor, wherein the memory is provided for storing computer executable instructions and the processor is used for executing the computer executable instructions to enable:
  the request receiving module to receive a plurality of data processing requests sent by a client, determine a target processing amount based on the number of the plurality of data processing requests, and limit a flow of the plurality of data processing requests in accordance with the target processing amount, to obtain a target data processing request;
  the proxy module to forward the target data processing request to a global transaction manager, receive a processing result from processing the target data processing request by the global transaction manager, and return the processing result to a client corresponding to each data processing request;
  wherein the target data processing request is data processing requests obtained, by the proxy module, from processing slots to be assigned in an amount same as the target processing amount, and the data processing requests in the processing slots to be assigned are placed, by the request receiving module, in the processing slots to be assigned of the shared memory area; and
  wherein the target data processing request is a distributed snapshot request, and the processing result is a result, received by the request receiving module, of calculating the distributed snapshot request by the global transaction manager.

13. A computing device, comprising:
  a memory and a processor;
  wherein the memory is provided for storing computer executable instructions and the processor is used for executing the computer executable instructions; wherein the processor executes the computer executable instructions to implement steps of the data processing method according to claim 1.

14. A non-transitory computer readable storage medium stored with computer executable instructions, wherein the computer executable instructions, when executed by a processor, implement steps of the data processing method according to claim 1.

15. The computer readable storage medium stored with computer executable instructions of claim 14;
  before the determining the target processing amount based on the number of the plurality of data processing requests, the data processing method further comprises:
    establishing a communication connection of the request receiving module with the proxy module based on the shared memory area.

16. The computer readable storage medium stored with computer executable instructions of claim 15, wherein the determining the target processing amount based on the number of the plurality of data processing requests comprises:
  determining, by the request receiving module, the number of processing slots to be assigned in the shared memory area based on the number of the plurality of data processing requests, and taking the number of processing slots to be assigned as the target processing amount.

17. The computer readable storage medium stored with computer executable instructions of claim 16, wherein the limiting the flow of the plurality of data processing requests in accordance with the target processing amount to obtain the target data processing request comprises:
  placing, by the request receiving module, data processing requests in an amount same as the target processing amount in processing slots to be assigned of the shared memory area in accordance with the target processing amount;
  obtaining, by the proxy module, from the processing slots to be assigned data processing requests in an amount same as the target processing amount, and taking the data processing requests as the target data processing request.

18. The computer readable storage medium stored with computer executable instructions of claim 15, wherein the forwarding the target data processing request to the global transaction manager comprises:
  upon determining that a communication connection has been established with the global transaction manager, forwarding, by the proxy module, the target data processing request to the global transaction manager based on the communication connection.

19. The computer readable storage medium stored with computer executable instructions of claim 17, wherein the forwarding the target data processing request to the global transaction manager comprises:
  upon determining that a communication connection has been established with the global transaction manager, forwarding, by the proxy module, the target data processing request to the global transaction manager based on the communication connection.

20. The data processing method of claim 4, wherein the forwarding the target data processing request to the global transaction manager comprises:
  upon determining that a communication connection has been established with the global transaction manager, forwarding, by the proxy module, the target data processing request to the global transaction manager based on the communication connection.

* * * * *